United States Patent [19]
St. Clair

[11] 4,067,355
[45] Jan. 10, 1978

[54] GAS PRESSURE REGULATOR HAVING HIGH AND LOW PRESSURE SHUT-OFF MEANS
[75] Inventor: Theodore A. St. Clair, Fairfield, Conn.
[73] Assignee: Textron Inc., Providence, R.I.
[21] Appl. No.: 680,584
[22] Filed: Apr. 26, 1976
[51] Int. Cl.[2] .............................................. G05D 16/06
[52] U.S. Cl. .................................... 137/458; 137/456; 137/505.46; 137/613; 137/614.14
[58] Field of Search .................... 137/456, 458, 505.46, 137/613, 614.14

[56] References Cited
U.S. PATENT DOCUMENTS

| 2,698,026 | 12/1954 | Roberts | 137/458 |
| 3,384,110 | 5/1968 | Wiley | 137/458 |
| 3,623,506 | 11/1971 | Bonner | 137/505.46 X |
| 3,809,108 | 5/1974 | Hughes | 137/505.46 X |

Primary Examiner—Robert G. Nilson
Attorney, Agent, or Firm—Arthur A. Johnson

[57] ABSTRACT

There is disclosed herein a gas pressure regulator having valve means for stopping the flow of gas downstream through the regulator when the pressure of the incoming gas is higher or lower than predetermined acceptable values even though acceptable pressure is subsequently restored, and manually operated means for resetting the valve means after it is determined that the pressure of the gas flowing to the inlet of the regulator has returned to said predetermined acceptable values, provision being made for maintaining a high pressure shut-off valve closed until manually opened even though pressure of gas in the regulator returns to acceptable pressure.

1 Claim, 5 Drawing Figures

GAS PRESSURE REGULATOR HAVING HIGH AND LOW PRESSURE SHUT-OFF MEANS

This invention relates to safety means for gas pressure regulators such as service regulators which supply fuel gas to utility customers. In the functioning of such regulators, there are potential hazards (even though rare) resulting particularly from excessive pressure and excessive underpressure conditions.

When an excessive underpressure condition exists, such as gas pressure failure, the pressure regulating valve of the regulator normally would be moved to wide open position and so remain until the pressure increases to an acceptable value. However, in the meantime, due to the excessive low pressure, any burners or pilot lights in use and not equipped with thermal safety shut-off valves, or in the case of malfunctioning thermal shut-off valves, gas will escape and accumulate in the atmosphere and create extremely hazardous explosive and asphyxiating conditions.

An object of this invention is to provide, in a service gas regulator having a single diaphragm, improved means for guarding against the hazardous conditions that result from excessively low pressure gas.

An important feature of this invention is to provide improved safety valve means which completely shuts off the flow of gas from the inlet port of the regulator to the outlet port thereof when the pressure of the gas drops below a predetermined value and remains in shut-off condition, even after acceptable pressure conditions are restored, with the provision of means whereby the regulator may not be reactivated, after it has been shut off because of excessive low pressure conditions, except by a person possessed of a tool and the knowledge of how and where to use it, after having checked all the burners and other gas outlets to determine that they all are closed.

Another feature is the provision of improved means in such a shut-off valve mechanism whereby the flow of gas to the regulator may be monitored and ultimately shut off, even if for any reason the main regulator valve fails to function, for instance when a foreign substance is interposed between the main valve and the orifice with which it cooperates.

Other features and advantages will hereinafter appear.

Figure 1:
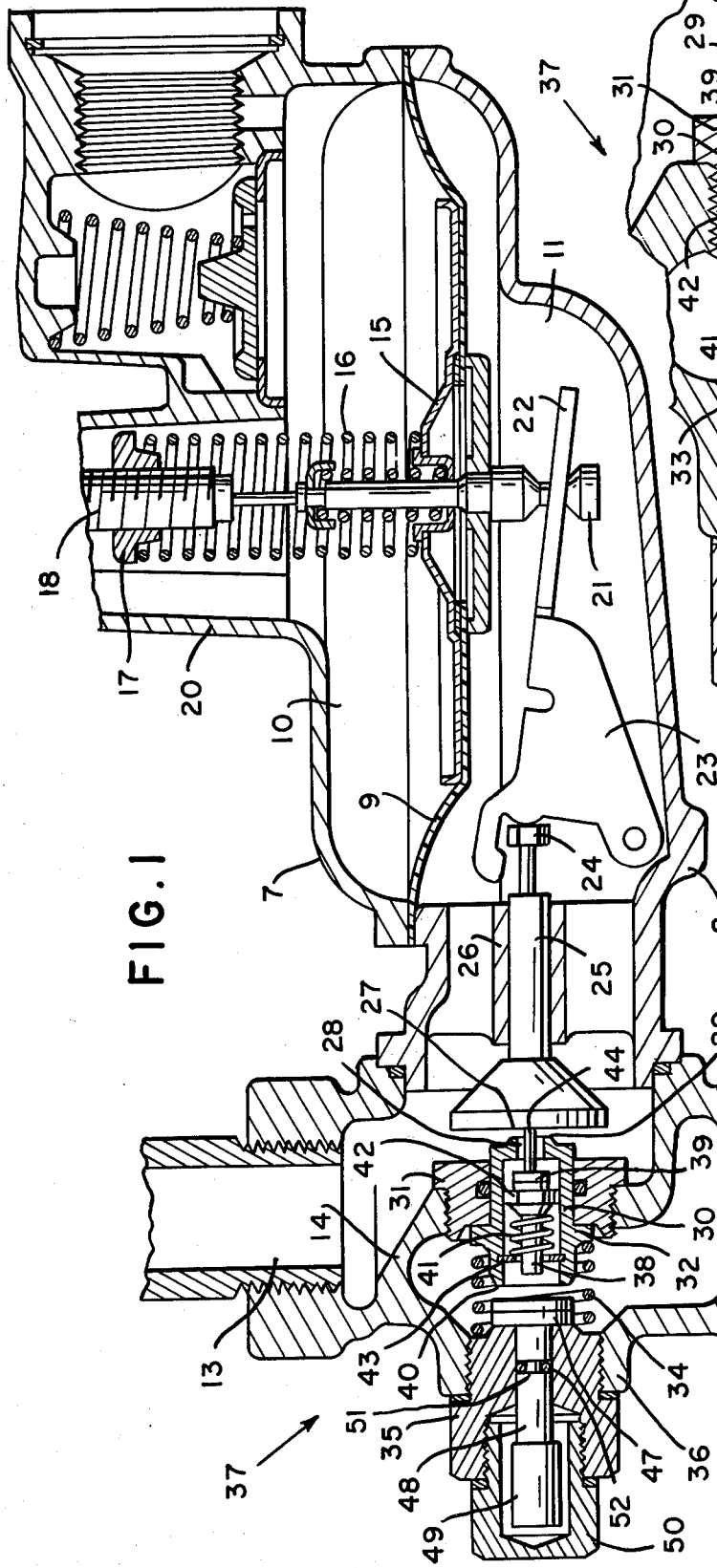
FIG. 1 is a vertical sectional view showing a regulator in normal pressure monitoring condition and showing the shut-off and control valves of the present invention installed in the dividing wall interposed between the inlet and outlet ports of the regulator.

As shown in the accompanying drawings, the regulator to which the present invention is applied, as illustrative thereof, has an upper housing 7 and a lower housing 8. Between said housings there is a diaphragm 9 forming an air chamber 10 and a downstream gas chamber 11. The regulator has an inlet port 12 and an outlet port 13 separated by a wall 14. A plate 15 on the diaphragm 9 is engaged by a coil spring 16 which yieldably urges the diaphragm 9 to its lowermost position. The upper end of the spring 16 engages a nut 17 on a screw 18 mounted on the top 19 of a housing 20 to adjust the force exerted by the spring 16.

Operating means 21 secured to the diaphragm 9 engages the end portion 22 of a bellcrank 23 which engages one end 24 of a valve stem 25 slidably mounted in a bearing 26 in the lower housing 8 of the regulator. The other end of the stem 25 carries a main valve 27 which is moved by the bellcrank 23 closer to or farther from an orifice 28 when moved by the diaphragm 9 acted on by opposing forces, force from gas pressure on the gas side of the diaphragm 9, and the force of the spring 16 on the atmosphere side of the diaphragm respectively.

The regulator spring 16 is so adjusted as to counteract the force of the incoming gas in the gas chamber 11 on the diaphragm 9 and causes the main valve 27 to move toward and away from a valve seat 29 or orifice 28 when the pressure of the incoming gas is within a predetermined range of acceptable pressures.

As in U.S. Pat. Nos. 3,613,725; 3,742,972; 3,754,570 and 3,809,108 the orifice 28 cooperating with valve seat 27 is an orifice sleeve 30 which is slidably mounted in a bushing 31 secured in the dividing wall 14 between the inlet port 12 and outlet port 13 of the regulator. But, as shown herein, the orifice sleeve 30 has a flange 32 positioned to engage the end on the bushing 31 under the force of a spring 34 interposed between the flange 32 and the inner end 33 of a plug 35 screwed into the wall 36 of the valve housing 37. As will appear below, the orifice sleeve 30 may recede from its normal position shown in FIGS. 1 and 3 against the force of the spring 34.

In the normal operation of the regulator the main valve 27, under the influence of the diaphragm 9, advances toward and recedes from the valve seat 29 to allow less or more gas to pass between the inlet 12 and the outlet 13 of the regulator to compensate for normal variations in the pressure of the gas flowing through the system. However, there are rare, but ever possible, occasions when the pressure of the gas entering the regulator deceases beyond acceptable safe limits and produces potentially hazardous situations with possible serious results as pointed out above.

When for any cause the pressure of the gas in the regulator drops below a predetermined range of pressure, as in a conventional regulator, the diaphragm 9 descends under the force of the regulator spring 16 and causes the main valve 27 to move away from the valve seat 29 and allow gas to freely flow into the diaphragm chamber 11 and through the outlet 13 to equipment being supplied with gas.

Normally under such low pressure conditions the flames of any operating burners or pilot lights would go out. If after this happens and the pressure comes back on the line, gas from any open burners or pilot lights which are not equipped with thermal shut-off valves (or in case any such valves are not functioning), will discharge into the atmosphere with the attendant danger of causing an explosion or possibly asphyxiating persons in the vicinity.

To avoid such hazards, there is provided (see FIG. 2) in the orifice sleeve 30 a shut-off valve body 38 which has a safety valve 39 adapted to engage an upstream valve seat 40 of the orifice sleeve 30 under the influence of a spring 41 which extends between an hexagonal guide block 42 forming part of the shut-off valve body 38 and a snap ring 43.

Figure 2:
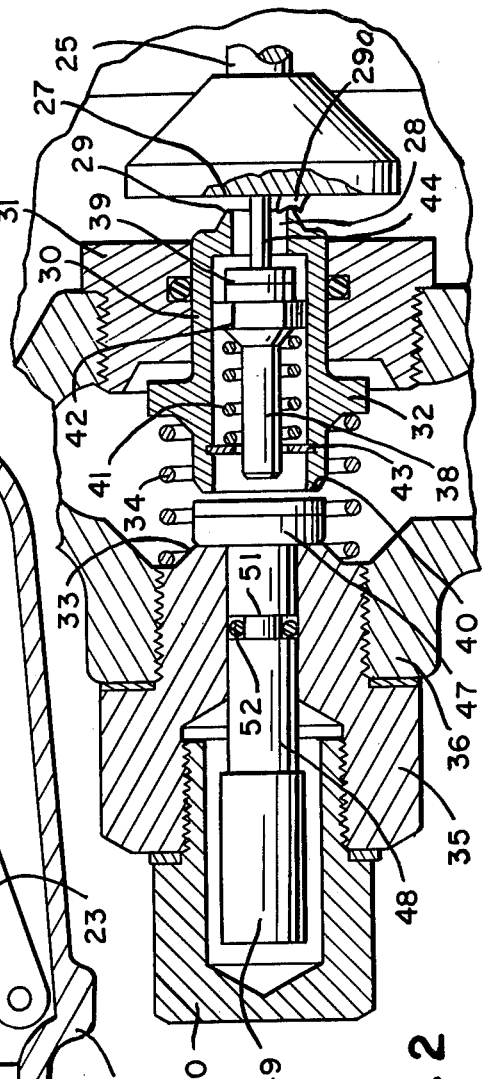
FIG. 2 is a sectional view on an enlarged scale of the valve mechanism of the present invention showing the position of the parts when a particle of foreign matter is lodged between the main valve seat and its orifice.

A pin 44, which may be mounted on the main valve 27, but, as shown, is affixed to the shut-off valve body 38, extends through and beyond the orifice 28, as shown in FIGS. 1 and 2, in which the movable parts are shown in normal pressure-regulating positions with the pin 44 engaging the main valve 27 and the outer edge portion of the safety valve 39 spaced from the upstream valve seat 40 of the orifice sleeve 30. In this position the gas flows around the upstream valve seat 40 of the orifice sleeve 30 past the snap ring 43 and guide block 42, between the safety valve 39 and upstream valve seat 40, through the orifice 28 of the orifice sleeve 30, between the latter and the main valve 27 into outlet 13 and impinging upon the gas in the diaphragm gas chamber 11.

Figure 3:
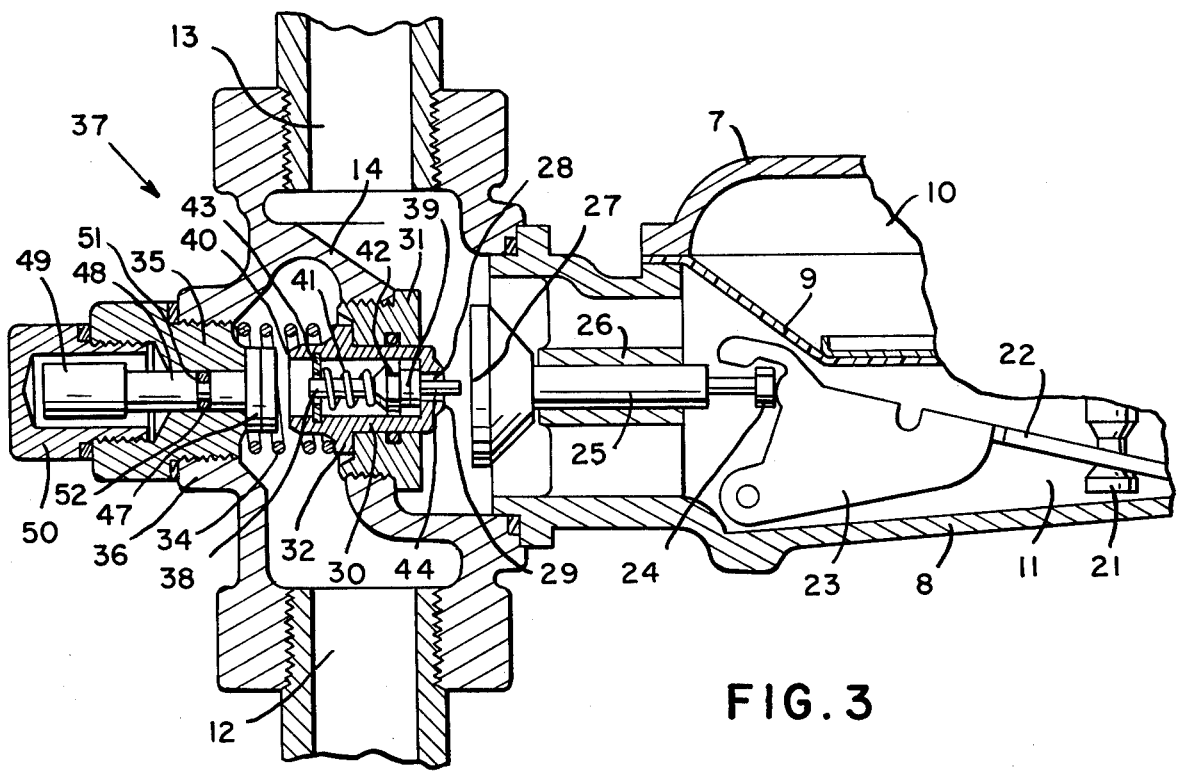
FIG. 3 is a vertical section of a portion of the regulator showing the movable parts of the pressure control and shut-off valves in the positions they occupy under excessively low pressure conditions.

In the normal operation of the regulator the safety shut-off valve body 38 reciprocates in the orifice sleeve 30 in response to the normal movement of the main valve 27 and does not control the amount of gas flowing through the regulator. However, if the pressure of the gas entering the regulator decreases below the lower limit of acceptable pressures, the main valve 27 will recede from the valve seat 28, as shown in FIG. 3, allowing the pin 43 and safety valve body 38 under the force of the spring 41 to move the safety valve 39 against the upstream valve seat 40 of the orifice sleeve 30 and shut off the flow of gas through the orifice 27 to the outlet 13 of the regulator as shown in FIG. 3.

If safe gas pressure is restored in the inlet 12, the regulator will remain locked up because the gas flowing into orifice sleeve 28 would impinge upon the guide block 42 and hold the safety valve 39 firmly against the upstream valve seat 40 of the orifice sleeve 30.

Figure 5:
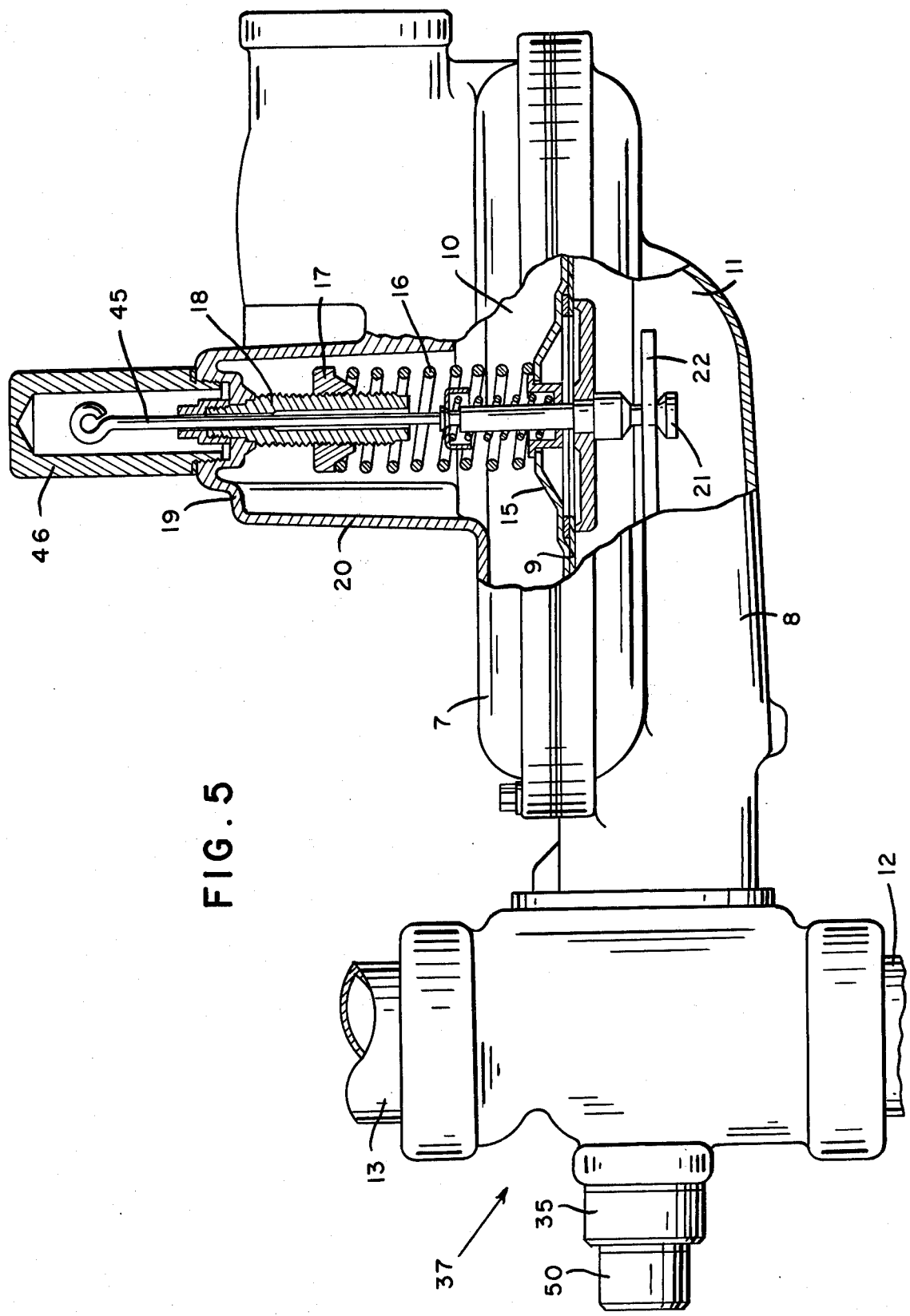
FIG. 5 is an elevation of the pressure regulator of the present invention with the diaphragm reset mechanism in section on an enlarged scale.

When the regulator is locked up by excessively low pressure shut-off means above described, after the gas appliances served by the regulator have been shut off, the regulator may be restored to normal operating condition by removing a cap 46 (FIG. 5) screwed into the housing 20 and covering the adjusting nut 17 and screw 18 for the diaphragm spring 16 and pulling on a rod 45 connected to operating means 21 to raise the diaphragm causing the bellcrank 23 to push the valve stem 25 and main valve 27 and hence the pin 44 and safety valve 39 to the left, as shown in FIG. 1, away from the upstream valve seat 40 which allows the gas to enter the chamber 11 and restore the diaphragm to its operating position.

Figure 4:
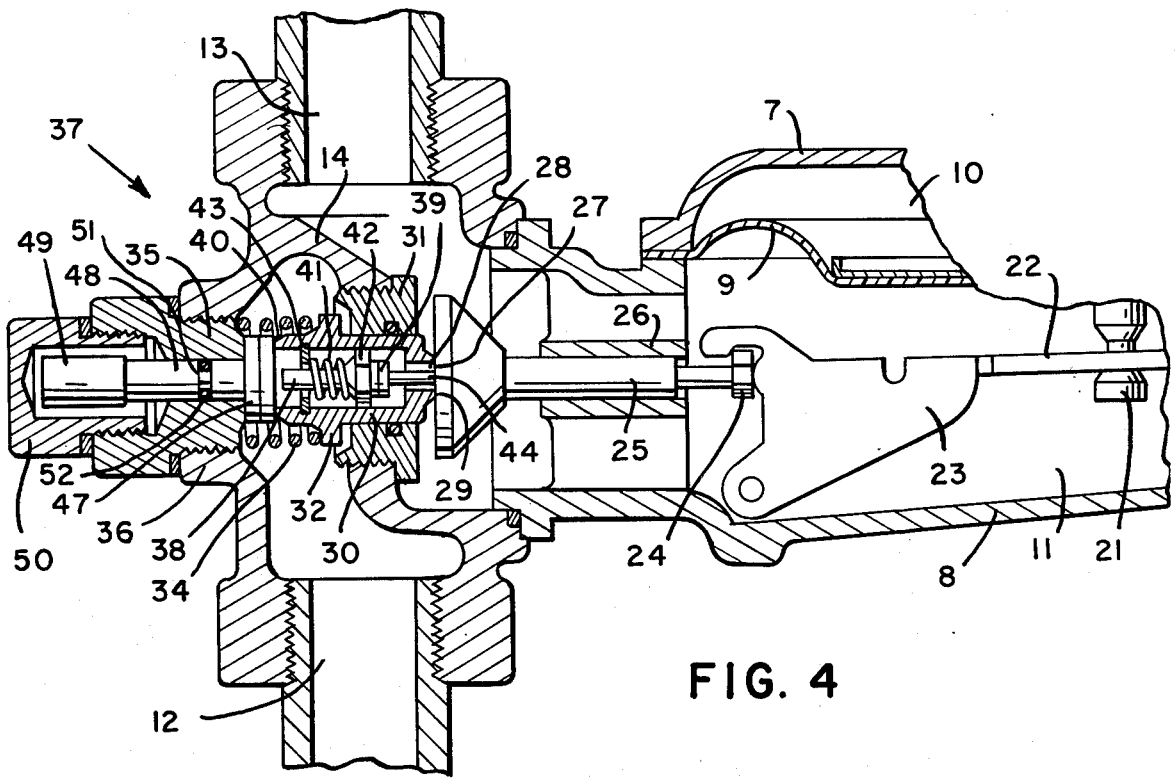
FIG. 4 is like FIG. 3, but shows the movable parts of the valves in the positions they occupy under excessively high pressure conditions.

When for any cause, for instance if a piece 29a of foreign matter becomes lodged in the valve seat 29, as shown in FIG. 2, the pressure of the gas in the chamber 11 under the diaphragm 9 rises beyond a predetermined limit, for instance to the position shown in FIG. 4, the bellcrank 23 will cause the valve 27 to engage valve seat 29 of orifice sleeve 30 and move it to the left, as shown in FIG. 4, against spring 34 until the upstream valve seat 40 contacts a valve seat 47 on a valve rod 48 mounted in the plug 35 in the valve housing. This stops the gas from flowing into the regulator. decreases, When the pressure of the gas in the chamber 11 drops to an acceptable operating range, the diaphragm spring 16 will cause the diaphragm to fall causing the bellcrank 23 to descend and main valve 27 and sleeve 30 to recede. This would cause the upstream valve seat 40 on the sleeve 30 to move away from the valve seat 47 and allow gas to again flow through the regulator and the system, permitting gas to escape through any open fixture into the air. However, this is prevented by the present invention by making the safety valve seat 47 so that it can follow the movement of the upstream orifice 40 as the pressure of the gas in the regulator decreases, the pressure of the gas in the inlet 12 holding the valve seat 47 against upstream orifice 40 and thus preventing the flow of the gas into the regulator.

In the form shown herein the safety valve seat 47 is mounted on a rod 48 slidably mounted in the plug 35 in the wall 36 of the valve housing 37. When the orifice sleeve 30 is held against the safety valve seat 47 by the pressure of gas on it, a handle portion 49 on the rod 48 which projects beyond the plug 35 may be grasped and pulled away from the plug 35 and thus separate the safety valve seat 47 from the orifice 40. This should be done only when it is safe to allow the gas to again flow through the regulator and the system.

To prevent uninformed persons from restoring the flow of gas before taking the precaution of turning off all fixtures before pulling the handle portion 48, there is provided a cap 50 which is tightly screwed in the bushing 49 to cover the conceal the handle portion 49. The cap 50 preferably has a smooth cylindrical surface so that it cannot be removed without the use of tools.

As shown in the accompanying drawing, the valve rod 48 is provided with an annular groove 51 to receive an O-ring 52 which performs the dual function of sealing the passage in the bushing 35 through which the valve rod extends and providing sufficient friction to hold the valve rod against casual or accidental movement.

Variations and modifications may be made within the scope of the claims and portions of the improvements may be used without others.

I claim:

1. A gas pressure regulator comprising a housing having an inlet means, outlet means and a wall separating said inlet means and said outlet means; a diaphragm in the housing forming a gas chamber communicating with said outlet means and a chamber open to the atmosphere; an orifice sleeve extending between and communicating with said inlet means and said outlet means; means for mounting said orifice sleeve in said wall for axial sliding movement relative to said wall, said orifice sleeve having an orifice, an upstream valve seat and a downstream valve seat; a main valve; means operated by said diaphragm for moving said main valve toward and from said downstream valve seat of the orifice sleeve to regulate the flow of gas to said gas chamber and outlet means; and means including a valve rod slidably mounted in said housing and a high pressure safety valve mounted on said rod and positioned to be engaged by said upstream valve seat to shut off the flow of gas through said orifice sleeve to said gas chamber and outlet means when the pressure of the gas in the gas chamber rises above a predetermined acceptable pressure, said safety valve being caused by pressure of the gas in said inlet means to remain in engagement with said upstream valve seat and keep the flow of gas shut off when said orifice sleeve returns to normal position upon the pressure of the gas in the regulator becoming acceptable; and manually operable means for separating said high pressure safety valve from said upstream valve seat on said upstream orifice, said orifice sleeve having a second upstream valve seat between said first-named upstream valve seat and said downstream valve seat, and a spring-urged valve slidably mounted in said orifice sleeve and controlled by said diaphragm for stopping the flow of gas through said downstream valve seat when the pressure of the gas in the gas chamber falls below a predetermined pressure, and manually operated means for causing the flow of gas to the gas chamber to be resumed.

* * * * *